US012802146B2

(12) United States Patent
Botes et al.

(10) Patent No.: US 12,802,146 B2
(45) Date of Patent: Nov. 17, 2026

(54) DYNAMIC DRIVING MODE ACTIVATION FOR LOW SPEED AUTONOMOUS NAVIGATION DRIVE THRU

(71) Applicant: Rivian IP Holdings, LLC, Irvine, CA (US)

(72) Inventors: Frederik Francois Botes, Ontario, CA (US); Byungjoo Kim, San Jose, CA (US); Steven Han Kanik, Sunnyvale, CA (US); Venkata Satya Kosuru, Sunnyvale, CA (US); Ishan Arora, Santa Clara, CA (US); Steven Yewen Wu, San Mateo, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 138 days.

(21) Appl. No.: 18/623,957

(22) Filed: Apr. 1, 2024

(65) Prior Publication Data

US 2025/0307963 A1 Oct. 2, 2025

(51) Int. Cl.

| | |
|---|---|
| ***G06Q 50/12*** | (2012.01) |
| ***B60Q 9/00*** | (2006.01) |
| ***B60W 60/00*** | (2020.01) |
| ***G06Q 20/30*** | (2012.01) |

(52) U.S. Cl.

CPC ......... *G06Q 50/12* (2013.01); *B60W 60/0025* (2020.02); *G06Q 20/30* (2013.01); *B60Q 9/00* (2013.01); *B60W 2552/05* (2020.02); *B60W 2555/60* (2020.02); *B60W 2720/10* (2013.01); *B60W 2756/10* (2020.02)

(58) Field of Classification Search

CPC ... G06Q 50/12; G06Q 20/30; B60W 60/0025; B60W 2552/05; B60W 2555/60; B60W 2720/10; B60W 2756/10; B60Q 9/00

See application file for complete search history.

(56) References Cited

U.S. PATENT DOCUMENTS

| | | | | |
|---|---|---|---|---|
| 2022/0101459 | A1* | 3/2022 | Hwang | G05D 1/221 |
| 2024/0059310 | A1* | 2/2024 | MacKenzie | G06Q 30/0635 |
| 2025/0206303 | A1* | 6/2025 | Glissmeyer | B60W 30/143 |
| 2025/0229806 | A1* | 7/2025 | Yame | B60W 60/0025 |
| 2025/0245761 | A1* | 7/2025 | Bailey | G06Q 50/12 |

* cited by examiner

*Primary Examiner* — Brian P Sweeney
*Assistant Examiner* — Jonathan E Reinert
(74) *Attorney, Agent, or Firm* — BakerHostetler

(57) ABSTRACT

Aspects of the disclosure relate to an approach for a specialized automated driving feature for designated low-speed navigable locations for vehicles. A vehicle may include automated driving platform that allows a driver to activate a designated low-speed area automated mode. The designated low-speed area automated mode may be used for ordering products or services, automated driving, and interactions associated with location centric features, such as features for a drive-thru.

30 Claims, 5 Drawing Sheets

DYNAMIC DRIVING MODE ACTIVATION FOR LOW SPEED AUTONOMOUS NAVIGATION DRIVE THRU

INTRODUCTION

When operating vehicles at some locations there may be situations in which there may be tedious driving attention needed at a slow speed, such as a school drop-off or pickup, leaving or arriving at major events (e.g., concerts or sporting events), or drive-thru (e.g., restaurants or banks).

In an example, there may be frequent instances along a navigable path for the vehicle in which there is congestion (e.g., people or vehicles) and frequent stop and go movement while inching forward every few seconds or minutes. Such situations may leave the driver in an awkward in-between state, in which the driver attempts to disengage while doing an active driving task. Some drivers may switch to using mobile phones or other devices, which may increase reaction time to move forward along the navigable path and may increase the probability of a low-speed collision.

Systems may be implemented to operate a vehicle along designated low-speed navigable paths. Aspects of the subject technology may help to improve the overall safety and driving efficiency and experience in a vehicle, when in such low-speed situations.

SUMMARY

This disclosure is generally directed to an approach for a specialized automated driving feature for designated low-speed navigable locations for vehicles. The disclosed subject matter may use an automated driving platform that allows a driver to activate a designated low-speed area automated mode (DLAAM). The DLAAM may be used for ordering products or services, automated driving, and interactions associated with location centric features, such as features for a drive-thru. In an example, drive-thru centric features may include alerts associated with order stations, payment stations, or food pick-up stations, among other things.

In accordance with one or more aspects of the disclosure, one or more apparatuses may have mechanisms for operating specialized automated driving feature for designated low-speed navigable locations for one or more vehicles. A vehicle may include one or more sensors; an automated driving system communicatively connected with the one or more sensors; and an infotainment system communicatively connected with the automated driving system. The infotainment system may display a request to activate a designated low-speed area automated mode based on the location of the vehicle proximate to a designated low-speed navigable location. The designated low-speed navigable location may include a drive-thru. The infotainment system may accept orders associated with the drive-thru based on the location of the vehicle. The automated driving system may activate based on the location of the vehicle proximate to the designated low-speed navigable location.

In accordance with one or more aspects of the disclosure, a method may include receiving an indication of a location of a vehicle; based on the location of the vehicle, determining the vehicle is in an eligible designated low-speed navigable path for the vehicle; based on the determining that the vehicle is in the eligible designated low-speed navigable path, transmitting a request to start a designated low-speed area automated mode (DLAAM); receiving a response indicating authorization to use DLAAM for the designated low-speed navigable path; and executing DLAAM for the designated low-speed navigable path. The DLAAM may include specialized automated driving of the designated low-speed navigable path for the vehicle.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The continuing evolution of automotive technology, which may include automated vehicles, aims to allow for a more seamless and comfortable experience for users to travel to their destinations. Conventionally, drivers may be placed in a situation in which there are in a low-speed stop and start experience (e.g., drive-thru), in which the driver has to arduously maintain keen attention to their surroundings to avoid collisions and keep the line moving, but would like to productively do something else (e.g., attend to a child, check email, or call friends or family). The disclosed subject matter may allow for automated driving (e.g., self-driving) of eligible designated low-speed navigable paths and other corresponding convenience features.

In an example, the disclosed subject matter may allow for an enhanced restaurant drive-thru experience. The designated low-speed area automated mode (DLAAM) may operate to engage automated driving, in which the occupant no longer has to take control of the vehicle and the vehicle may automatically be guided to the appropriate position (e.g., terminal, lane, or station) to obtain items that have been ordered. In addition, the DLAAM may interact with internal restaurant systems which may allow for more efficient timing of food and positioning of the vehicle in the drive-thru for an enhanced experience for the vehicle occupant as well as more efficient use of resources for the restaurant. It is contemplated that this restaurant drive-thru example may also apply for other designated low-speed navigable path situations.

Figure 1:
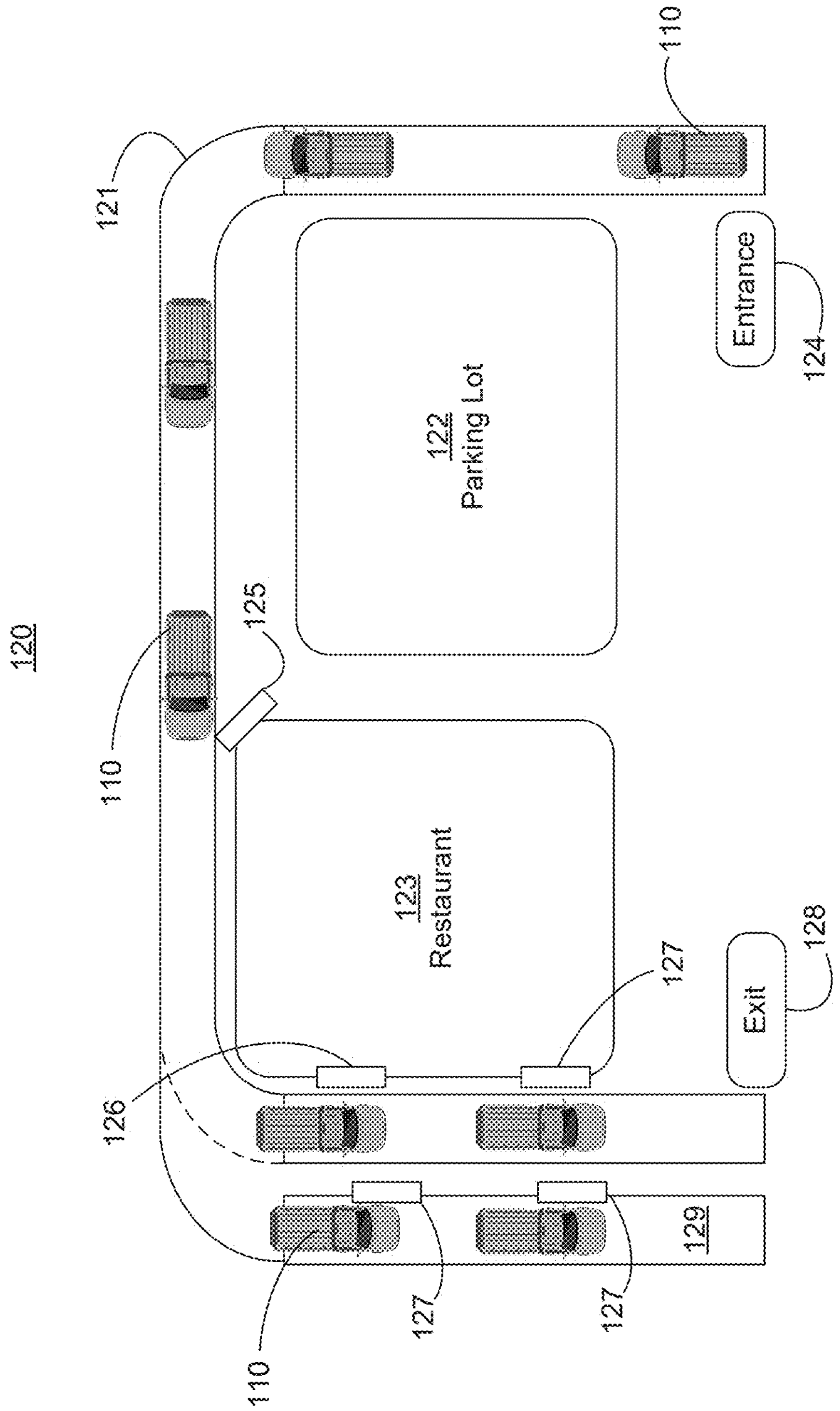
FIG. 1 illustrates an exemplary designated low-speed navigable path.

A designated low-speed navigable path may be associated with situations such as school drop-off or pickup, leaving or arriving at major events (e.g., concerts or sporting events), or drive-thrus, among other things. FIG. 1 illustrates an exemplary designated low-speed navigable path. As shown, there may be location 120 that includes designated low-speed navigable path 121 (also referred herein as path 121) associated with a drive-thru for restaurant 123. There may be collection station 127, payment station 126, station 111, station 112, or order station 125 associated with restaurant 123. Station 111 or station 112 may be flexible stations (e.g., payment station or collection station) which may be based on different factors. For example, if vehicle 110 has already paid, then it may be navigated to station 111 or station 112 for collection. Location 120 may also include vehicle 110 and parking lot 122. Path 121 may include entrance 124 or exit 128.

Figure 2:
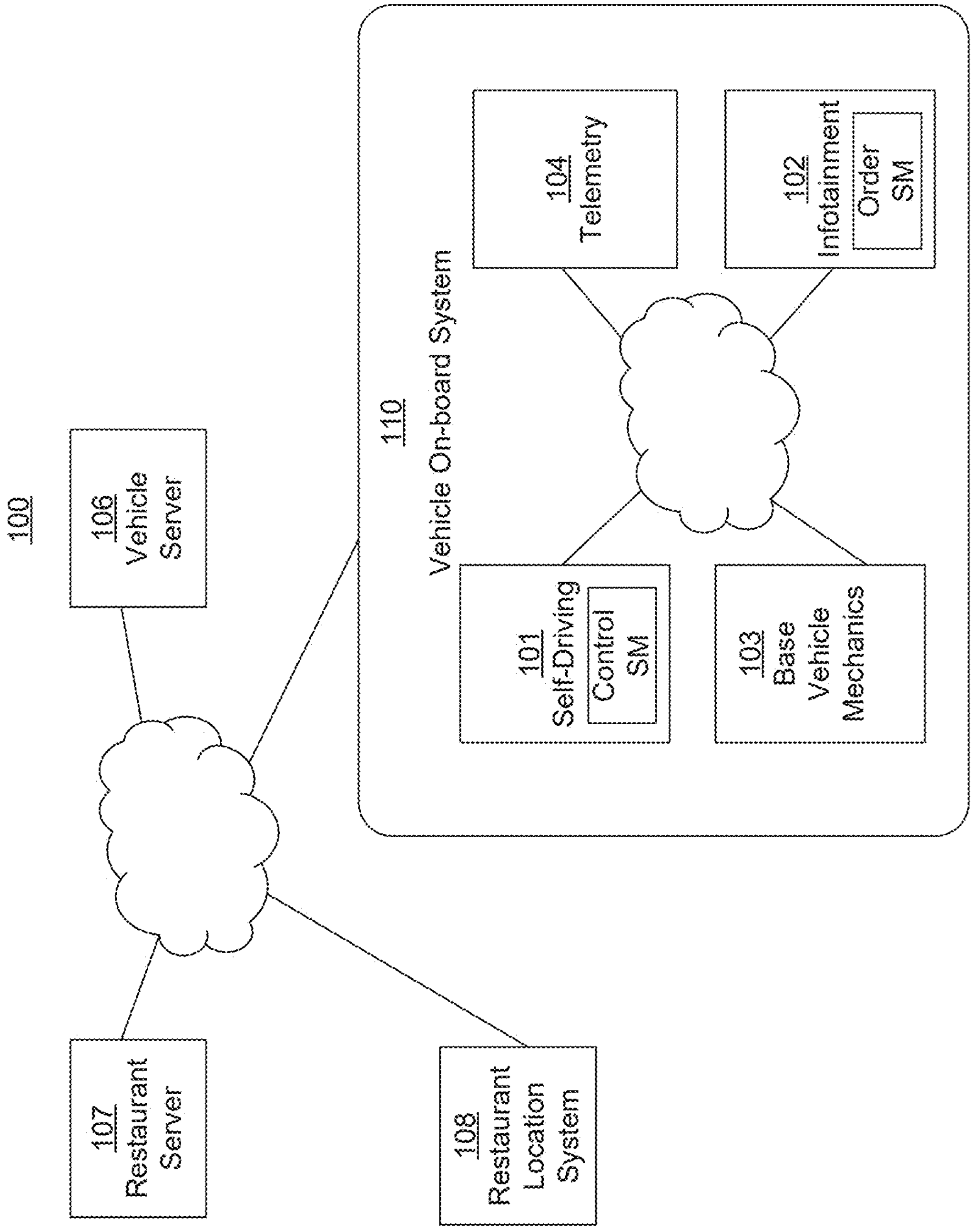
FIG. 2 illustrates an exemplary system that may be used to implement one or more features of the designated low-speed area automated mode.

FIG. 2 illustrates an exemplary system 100 that may be used to implement one or more features of the designated low-speed area automated mode, as disclosed herein. Automated vehicles may rely on sensors, actuators, machine learning systems, or powerful processors to execute an automated driving experience. As shown, system 100 may include vehicle 110, restaurant server 107, vehicle server 106, or restaurant location system 108, among other things, which may be communicatively connected with each other. Vehicle server 106 may relay or receive vehicle information, order information, or location information. Restaurant server 107 may receive order information or send menu information, among other information. Restaurant location system 108 may obtain information from or send information (e.g., order status) to restaurant server 107, vehicle 110, or vehicle server 106. It is contemplated that some components of system 100 may be on a single device or distributed over multiple devices. Some components of system 100 may be functional components.

Vehicle 110 may have a plurality of subsystems or devices that may receive data, send data, or execute operations for implementing the one or more features of the designated low-speed area automated mode, as disclosed herein. For example, vehicle 110 may include self-driving system 101, infotainment system 102, base vehicle mechanics 103, or telemetry system 104, among other things, which may be communicatively connected with each other.

Self-driving system 101 may include or connected with functionalities including location (e.g., GPS), mapping of location 120 (e.g., high-definition maps), perception functionality, or control state machines, among other things. Perception functionality may include functions to recognize one or more features or object detection, which may be particularly associated with location 120. For example, perception functionality may determine when vehicle 110 has arrived at entrance 124, order station 125, payment station 126, collection station 127, or exit 128. Perception functionality may also determine whether there are obstacles, pedestrians, different lanes, merged lanes (e.g., zipper merge), or flow of vehicles, among other things. With reference to order station 125, payment station 126, or collection station 127, it is contemplated that such stations may be a traditional window (in the context of payment or collection) or speaker/microphone (e.g., in the context of ordering). It is also contemplated the stations may include automated windows, touch screens, receptacles, or restaurant/business personnel (e.g., attendant) that may need to be recognized by perception functionality.

Self-driving system 101 may execute multiple operations, which may be operated by, in whole or in part, the control state machine of self-driving system 101. Self-driving system 101 may determine that vehicle 110 is in an eligible designated low-speed navigable path, which may be based on maps or GPS, among other things. Self-driving system 101 may send a request message to infotainment system 102. The request message may provide an indication (e.g., text/sound in a central information display-CID) regarding whether to commence designated low-speed area automated mode or other associated operations associated with designated low-speed area automated mode.

Base vehicle mechanics 103 may include motors, braking, steering, or lights. Base vehicle mechanics 103 may receive actuation commands or send system status. The actuation commands or system status may be received or sent from self-driving system 101. In an example, based on a perception of a restaurant personnel on or around the path, a message be sent to one or more base vehicle mechanics 103 to execute a braking action to stop near the restaurant personnel. Self-driving system 101 may receive a cancel indication from base vehicle mechanics 103, such as an indication of external braking or steering from a user, a collision indication, or a cancelation message from infotainment system 102 based on a button press, or the like.

Infotainment system 102 may connect with a display or input device (the display may be a touch screen input device). Infotainment system 102 may be connected with a display or input device that may be integrated into vehicle 110 (or a communicatively connected to Infotainment system 102) or receive information based on touchscreen or other inputs. Infotainment system 102 may include an ordering state machine that helps with operations which may be associated with integrated ordering at location 120 using the vehicle 110 while the control state machine (or the like) is active.

Infotainment system 102 may execute multiple operations, which may be operated by, in whole or in part, the ordering state machine of self-driving system 101. Infotainment system 102 may recognize when designated low-speed area automated mode is active, send a prompt to look at or display a menu for restaurant 123, provide status of an order associated with restaurant 123, or provide status of an operation associated with designated low-speed area automated mode. In addition, infotainment system 102 may use GPS data to determine drive-thru or other location eligibility for designated low-speed area automated mode. Telemetry system 104 may receive order requests and send them to a system (e.g., restaurant server 107) associated with restaurant 123 for further processing, which may include payment processing.

Figure 3:
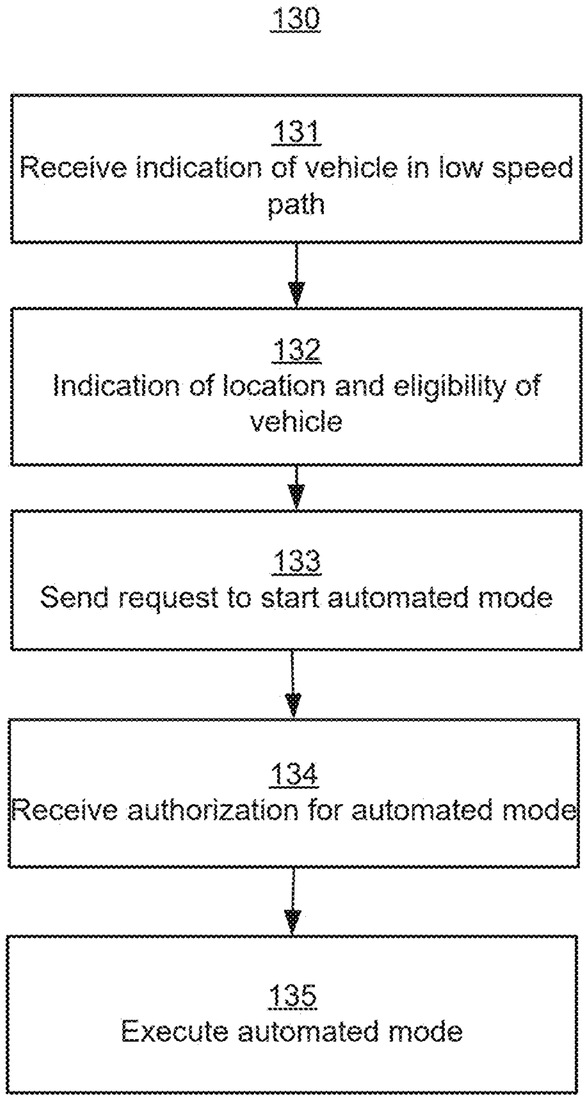
FIG. 3 illustrates an exemplary method associated with a designated low-speed area automated mode for a vehicle.

FIG. 3 illustrates an exemplary method 130 associated with a designated low-speed area automated mode for a vehicle that may be executed by one or more devices of system 100. At block 131, an indication of a location 120 of vehicle 110 may be received. Location 120 may be obtained by using GPS or some other location related system. At block 132, based on the location of the vehicle 110, an indication may be received that vehicle 110 is in an eligible designated low-speed navigable path 121 for vehicle 110. A speed may be a considered a low speed when it is approximately the average speed or less of a person walking or running (e.g., approximately less than 8 miles-per-hour). There may be a maximum speed set for a DLAAM implementation (e.g., 10 miles-per-hour). There may be a predetermination that location 120 and path 121 is associated with restaurant 123 and is eligible for the designated low-speed area automated mode. The predetermination may be based on reviewing historical information of a plurality of vehicle, or the designated type of business (e.g., laundry mat or fast-food), among other things. Therefore, when vehicle 110 is indicated to be at location 120, the location 120 is determined to be eligible.

At block 133, based on the indication that vehicle 110 is in an eligible designated low-speed navigable path 121, a request may be transmitted to start a designated low-speed area automated mode (DLAAM). The DLAAM may include automated driving of the designated low-speed navigable path for the vehicle as well as other convenience features associated with DLAAM. As discussed in more detail herein, the convenience features may include ordering products or services for pick-up or implementation, or alerting a facility of a pick-up (e.g., person/student, product, or service), among other things. The product may be a food item (e.g., fast-food or grocery) or non-food item (e.g., hardware store materials). The service may be a car wash or charging station.

At block 134, there may be a response received that indicates authorization to use DLAAM for path 121. At block 135 DLAAM may be executed for the designated low-speed navigable path.

The DLAAM may be refined based on an examination of historical use of DLAAMs or manual driver navigation of path 121. There may be instances when location 120 is not initially eligible for DLAAM. It is contemplated that the occupant of vehicle 110 may request such location 120 be eligible in the future. Vehicle 110 may contribute to the eligibility based on an authorized recording and analysis of a plurality of trips along path 121. In addition, the site (e.g., restaurant 123) may opt-in or opt-out of one or more features associated with the DLAAM or provide navigable path high-definition or the like maps to assist in the implementation of the DLAAM. The opt-in or opt-out by the site may be dynamic (e.g., day, hour, month, etc.), which may be based on any number of factors, such as weather, construction, time of day, personnel (e.g., employee availability), or system maintenance, among other things.

Figure 4:
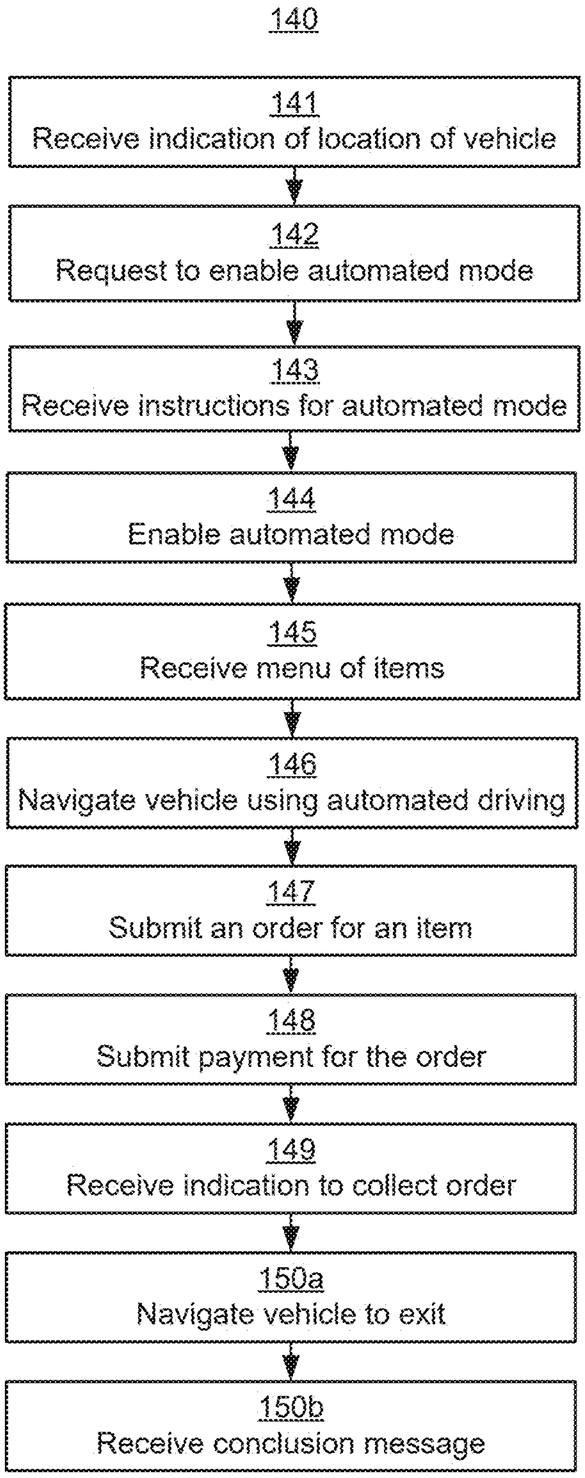
FIG. 4 illustrates an exemplary method associated with a designated low-speed area automated mode for a drive-thru instance.

FIG. 4 illustrates an exemplary method 140 associated with a designated low-speed area automated mode for a drive-thru instance. At block 141, an indication of a location 120 of vehicle 110 may be received. Location 120 may be a drive-thru location for restaurant 123. Location 120 may correspond with a geofence of an area (e.g., restaurant 123, parking lot 122, and path 121, among other things). It is contemplated that there may be detection of vehicle 110 at entrance 124 of location 120. The detection may be executed by a perception mechanism associated with self-driving system 101.

At block 142, based on a determination that vehicle 110 is at entrance 124, a request to enable DLAAM may be sent to a display of infotainment system 102. At block 143, infotainment system 102 may receive instructions to enable DLAAM. At block 144, DLAAM may be enabled, which may include enabling convenience features, such as ordering one or more items using a central information display (CID) or the like of infotainment system 102. At block 145, receive a menu of items associated with the restaurant. The menu of items may be shown on a CID of infotainment system 102.

At block 146, using automated driving to navigate vehicle 110 along path 121. At block 147, sending an order to restaurant server 107 of restaurant 123 for processing. The order may be sent electronically via infotainment system 102. Alternatively, the order may be received by order station 125, in which vehicle 110 navigates to. Order station 125 may be a speaker/microphone box, may be restaurant personnel, a touch screen, or the like. At block 148, payment may be sent for the order. The payment may be sent via infotainment system 102. Alternatively, or in addition to, vehicle 110 may be automatically navigated to payment station 126, in which payment is provided. At block 149, the order may be collected, which may be based on receiving an indication to collect the order. Vehicle 110 may be automatically navigated to collection station 126. At block 150*a*, vehicle 110 may be automatically navigated to exit 126. Exit 128 may be detected and a conclusion message may be sent (block 150*b*) via infotainment system 102. The message may be an indication that DLAAM is deactivating and there may be a request that the occupant of vehicle 110 take control.

At each step of the process, such as ordering, payment for the order, and collecting the order, there may be a message sent via infotainment system 102 in order to alert an occupant of vehicle 110 of the progress along path 121, any action needed, or status of the order.

It is contemplated that the implementation of the disclosed subject matter may allow for unique designs of locations, such as drive-thrus. In an example, the act of ordering may activate DLAAM (or initiate a prompt to activate DLAAM) or another automated driving mode. There may be no need for payment windows or collection windows, as conventionally constructed. Payment may be done via infotainment system 102 or another device. When payment is completed via the infotainment system 102 or the like, in an example, vehicle 110 may be directed to another lane, such as lane 129, which may only have collection stations 127. Collection may be done by a person walking to vehicle 110 or in an automated manner, such as an automated repository that may include the ordered item, which may be kept at a preferred temperature.

Figure 5:
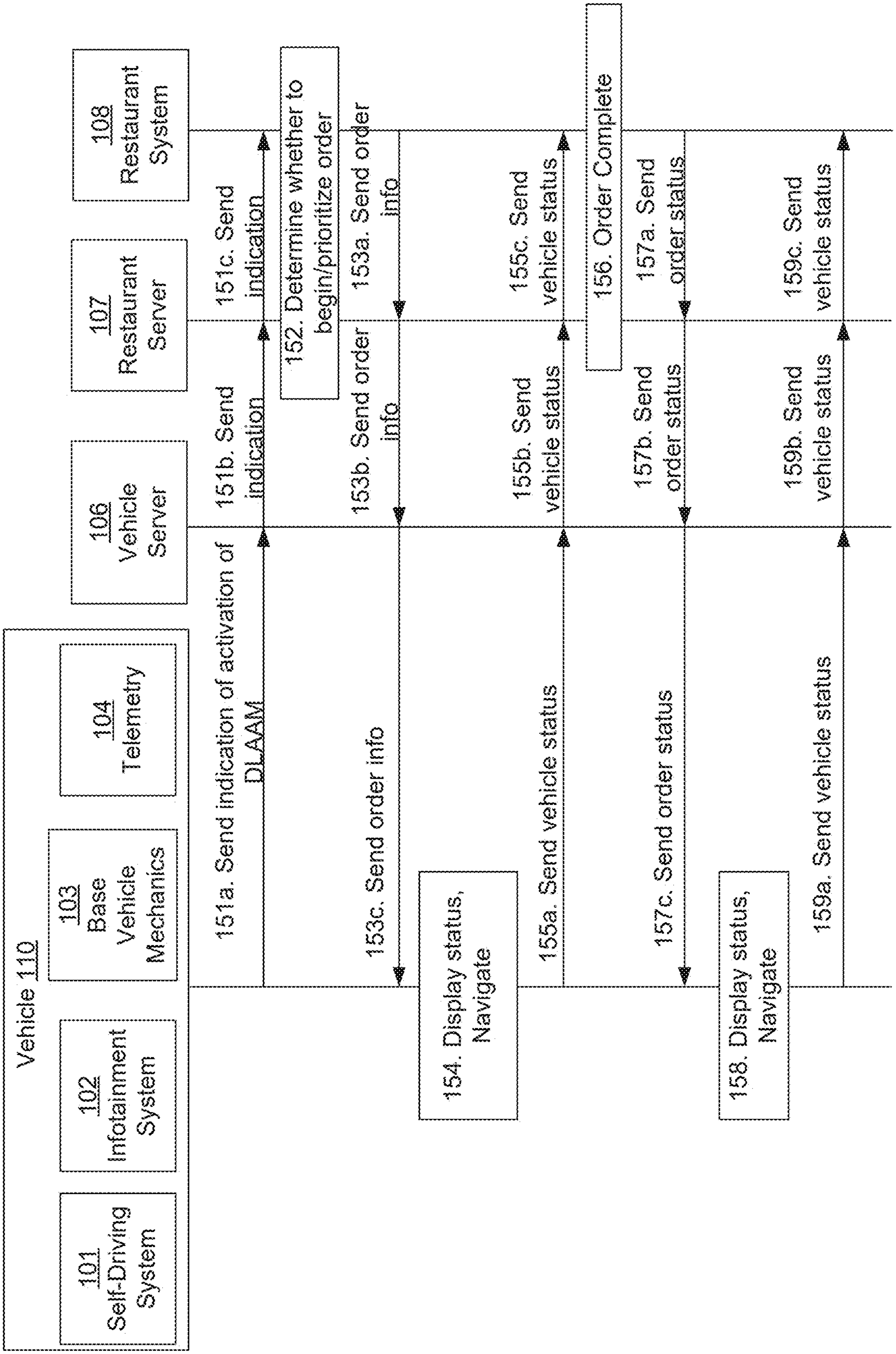
FIG. 5 illustrates an exemplary sequence diagram associated with a designated low-speed area automated mode.

FIG. 5 illustrates an exemplary sequence diagram associated with designated low-speed area automated mode. This example implementation is associated with a restaurant drive-thru, but may be applicable to other situations as disclosed herein. For simplicity, exemplary functionality of vehicle 110 that may include self-driving system 101, infotainment system 102, base vehicle mechanics 103, or telemetry system 104 are consolidated into one node (vehicle 110) in the sequence.

At step 151*a*, vehicle 110 may send information that may include vehicle information, order information, or location information, which may be to vehicle server 106. The vehicle information may include an indication of activation of DLAAM, a request for authorization for DLAAM, vehicle owner information, license plate, or a description of vehicle make, model, or color, among other things. At step 151*b*, vehicle server 106 may relay the information of step 151*a* or remove or add information, which may be based on the preferred format of restaurant 123. For example, information may be removed for privacy purposes. The information of step 151*b* may be sent to restaurant server 107 or sent (step 151*c*) to local restaurant system 108 for processing.

At step 152, restaurant server 107 or local restaurant system 108 may process the received information of step 151*b* or step 151*c*. For example, restaurant server 107 may determine whether to begin preparing the received order, may determine whether to place a priority on the order based on any number of factors (e.g., a frequent customer status), or the like.

At step 153*a*-step 153*c*, order information or path 121 information may be sent to vehicle 110. The order information may be order status, such as order accepted, expected wait time, or the like. Path 121 information may include updates to the path, such as obstructions or otherwise closed paths, among other things. Vehicle server 106 may remove or add information, which may be based on the preferred format of vehicle server 106 or vehicle 110. At step 154, vehicle 110 may display status of order and may navigate the vehicle based on the order information. For example, if the order is not accepted, then vehicle 110 may remain stationary until the order is indicated as accepted. At step 155*a*-step 155*c*, vehicle status information may be sent to vehicle server 106, restaurant server 107, or local restaurant system 108. The vehicle status information may include the aforementioned vehicle information, updated order information, payment information, or location information associated with the vehicle. In an example, local restaurant system 108 may display the location of vehicle 100 along path 121, which may influence priority placed on preparing the order.

At step 156, restaurant server 107 or local restaurant system 108 may process the received information of step 155*a*-step 155*c*. For example, restaurant server 107 may determine that the order is complete and determine a specific collection location in the drive-thru or other instructions regarding collection of the order.

At step 157*a*-step 157*c*, order information may be sent to vehicle 110. Vehicle server 106 may remove or add order information, which may be based on the preferred format of vehicle server 106 or vehicle 110. At step 158, vehicle 110 may display status of an order, vehicle 110 may display collection location, vehicle 110 may navigate the vehicle based on the order information for associated path 121 information, or other operations. For example, if the order is complete, then instructions regarding a collection location may be sent to vehicle 110. At step 159*a*-step 159*c*, vehicle 110 may send additional status information, such as the disabling of DLAAM or the location of vehicle 110 beyond path 121. The disclosed steps herein may be performed in a different order than presented.

The disclosed subject matter may be directed to a designated low-speed area automated mode and may be used with vehicles, such as an electric vehicle. The disclosed subject matter may enhance the experience of designated low-speed areas by allowing a vehicle occupant to safely disengage by relying on automated driving. The automated driving may be primarily based on advanced driver assistance systems (ADAS), which may be implemented at level 2 or higher automation. In addition, the disclosed subject matter may allow for more efficient ordering of items or services or movement of vehicles and may reduce the likelihood of collisions.

Methods, systems, and apparatuses, among other things, as described herein may provide for designated low-speed area automated mode. For example, a vehicle may include a one or more sensors, an automated driving system communicatively connected with the one or more sensors, and an infotainment system communicatively connected with the automated driving system. The infotainment system may accept orders associated with a drive-thru or other designated low-speed area based on a location of the vehicle. The automated driving system may activate based on the location of the vehicle proximate to the drive-thru or another designated low-speed area. All combinations in this paragraph (including the removal or addition of steps or components) are contemplated in a manner that is consistent with the other portions of the detailed description.

The methods, systems, or apparatuses disclosed herein may be incorporated into electric vehicles or other devices. The methods, systems, or apparatuses disclosed herein may be incorporated into products, such as various feature specific electronic control units (ECUs) to perform automated driving, infotainment, or vehicle dynamics/control. In an example, a method may include receiving an indication of a location of a vehicle; based on the location of the vehicle, determining the vehicle is in an eligible designated low-speed navigable path for the vehicle; based on the determining that the vehicle is in the eligible designated low-speed navigable path, transmitting a request to start a designated low-speed area automated mode (DLAAM); receiving a response indicating authorization to use DLAAM for the designated low-speed navigable path; and executing DLAAM for the designated low-speed navigable path. The DLAAM may include automated driving of the designated low-speed navigable path for the vehicle. In an example, a method may include detecting that a drive-thru payment terminal is ready for payment for an order associated with a user profile or the vehicle. In other nomenclature the DLAAM may include a drive-thru pilot system which may be specifically for a drive-thru location and include the DLAAM features disclosed herein. In addition, a designated low-speed area may be referred to as a designated low-speed navigable location. The designated low-speed navigable path is within a designated low-speed area. All combinations in this paragraph and the previous paragraphs (including the removal or addition of steps or components) are contemplated in a manner that is consistent with the other portions of the detailed description.

Path 121 may be determined to be low-speed based on the speed of a vehicle on average during operation in the area (e.g., along the path 121) being approximately less than or equal to the average speed for an individual walking or running. The average speed of an individual running may be approximately 8 miles-per-hour. Path 121 may be geofenced and therefore indicated as a designated low-speed navigable path. The designated low-speed navigable path for the vehicle may include a restaurant drive-thru, dry cleaner drive-thru, school drop-off or pickup, bank drive-thru, major event arrival or departure (e.g., sporting event), or the like. All combinations in this paragraph and the previous paragraphs (including the removal or addition of steps or components) are contemplated in a manner that is consistent with the other portions of the detailed description.

The executing the DLAAM for the designated low-speed navigable path may include receiving a menu of products or services associated with the designated low-speed navigable path. The executing the DLAAM for the designated low-speed navigable path may include detecting that an ordering station is ready for ordering from the vehicle; and based on the detecting that the ordering station is ready for ordering from the vehicle, transmitting, via a display, audio, or haptic feedback, an indication that the ordering station is ready for ordering from the vehicle. The ordering station may include a display inside the vehicle. The ordering station may include a microphone or an attendant outside the vehicle. The term terminal may be used instead of station. The payment station may include a display inside the vehicle. The payment station may include a repository that may be automated, a window, or an attendant outside the vehicle. The automated repository may detect the appropriate vehicle for the associate order based on a perception operation (e.g., vehicle license plate, vehicle description (e.g., model and color), etc.), a receipt, or some other identification. Execution of the DLAAM for the designated low-speed navigable path may include sending status information of the vehicle to a server associated with a business of the designated low-speed navigable path. The business may be a restaurant or the like. The status information may include location information, payment information, updated order information, or other information disclosed herein. The status information may be a status received by the vehicle, such as an expected time of completion of the order (e.g., expected time to be able to collect the order), payment confirmation, order confirmation, or the like. All combinations in this paragraph and the previous paragraphs (including the removal or addition of steps or components) are contemplated in a manner that is consistent with the other portions of the detailed description.

Note the methods or systems disclosed herein may be performed by computing equipment. The computing equipment may be integrated into a vehicle. The computing equipment may include mobile devices (e.g., tablet computers), servers, or any other device that can execute computing functions. Although not required, the methods and systems disclosed herein may be described in the general context of computer-executable instructions, such as program modules, being executed by a computer, such as a server or mobile computing device. Generally, program modules include routines, programs, objects, components, data structures and the like that perform particular tasks or implement particular data types. In a distributed computing environment, program modules may be located in both local and remote memory storage devices. All combinations in this paragraph and the previous paragraphs (including the removal or addition of steps or components) are contemplated in a manner that is consistent with the other portions of the detailed description.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, or systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A method comprising:

receiving an indication of a location of a vehicle;

based on the location of the vehicle, determining the vehicle is in a designated low-speed navigable path for the vehicle, wherein the designated low-speed navigable path is determined to be eligible for a designated low-speed area automated mode (DLAAM) based on historical use of the DLAAM along the designated low-speed navigable path;

based on the determining that the vehicle is in the designated low-speed navigable path, transmitting a request to start the DLAAM, wherein the DLAAM comprises automated driving of the designated low-speed navigable path for the vehicle;

receiving a response indicating authorization to use the DLAAM for the designated low-speed navigable path; and executing the DLAAM for the designated low-speed navigable path.

2. The method of claim 1, wherein the low-speed is set at a speed less than ten miles per-hour.

3. The method of claim 1, wherein the designated low-speed navigable path for the vehicle comprises a drive-thru.

4. The method of claim 1, wherein the executing the DLAAM for the designated low-speed navigable path comprises receiving a menu of products or services associated with the designated low-speed navigable path.

5. The method of claim 1, wherein the executing the DLAAM for the designated low-speed navigable path comprises:

receiving an indication that a payment has been received for an order associated with the designated low-speed navigable path; and based on the indication that the payment has been received, navigating the vehicle to a collection station.

6. The method of claim 1, wherein the executing the DLAAM for the designated low-speed navigable path comprises:

receiving an indication that an order has been received associated with the designated low-speed navigable path; and based on the indication that the order has been received, navigating the vehicle to a payment station.

7. The method of claim 1, wherein the executing the DLAAM for the designated low-speed navigable path comprises sending status information of the vehicle to a server associated with a business of the designated low-speed navigable path, wherein the status information comprises location information.

8. The method of claim 1, wherein the executing the DLAAM for the designated low-speed navigable path comprises receiving status information of an order associated with a business of the designated low-speed navigable path, wherein the status information comprises expected time of completion of the order.

9. The method of claim 1, wherein the executing the DLAAM for the designated low-speed navigable path comprises:

detecting that an ordering station is ready for ordering from the vehicle; and based on the detecting that the ordering station is ready for ordering from the vehicle, transmitting, via a display, audio, or haptic feedback, an indication that the ordering station is ready for ordering from the vehicle.

10. The method of claim 9, wherein the ordering station comprises at least one of the display inside the vehicle, a microphone outside the vehicle, or an attendant outside the vehicle.

11. The method of claim 1, wherein the executing the DLAAM for the designated low-speed navigable path comprises:

detecting that a payment station is ready for payment for an order associated with a user profile or the vehicle; and based on the detecting that the payment station is ready for payment, navigating the vehicle to the payment station and transmitting, via a display, audio, or haptic feedback, an indication that the payment station is ready for payment.

12. The method of claim 11, wherein the payment station comprises at least one of: the display inside the vehicle, an automated repository or an attendant outside the vehicle.

13. The method of claim 1, wherein executing the DLAAM comprises maintaining a predefined queue spacing or headway along the designated low-speed navigable path.

14. The method of claim 1, wherein transmitting the request to start DLAAM comprises sending a message from the vehicle to infrastructure associated with the designated low-speed navigable path.

15. The method of claim 1, wherein transmitting the request comprises sending a message from an automated driving system to an infotainment system.

16. The method of claim 1, wherein the designated low-speed navigable path is determined based on map data or navigation data, and wherein the designated low-speed navigable path comprises at least one of a predefined route for the vehicle, a school drop-off lane, a stadium ingress or egress lane, or another event-specific low-speed lane.

17. The method of claim 1, wherein executing the DLAAM comprises automated driving to navigate the vehicle along the designated low-speed navigable path to progress the vehicle through the designated low-speed navigable path.

18. The method of claim 1, wherein the historical use of the DLAAM is supplemented with historical manual navigation of the designated low-speed navigable path by an operator of the vehicle.

19. The method of claim 1, wherein the historical use of the DLAAM is determined from recorded use of the DLAAM along the designated low-speed navigable path.

20. The method of claim 1, wherein the designated low-speed navigable path is determined to be eligible for the DLAAM based on analysis of a plurality of trips along the designated low-speed navigable path.

21. The method of claim 1, wherein eligibility of the designated low-speed navigable path for the DLAAM is determined based on authorization associated with recording and analysis of navigation along the designated low-speed navigable path.

22. The method of claim 1, wherein eligibility of the designated low-speed navigable path for the DLAAM is based on a received input at the vehicle requesting that the designated low-speed navigable path be eligible for the DLAAM.

23. The method of claim 1, wherein eligibility of the designated low-speed navigable path for the DLAAM is based on configuration data associated with a site corresponding to the designated low-speed navigable path.

24. The method of claim 23, wherein the configuration data comprises an opt-in or opt-out setting controlling availability of the DLAAM.

25. The method of claim 23, wherein the configuration data associated with the site is dynamically adjusted based on one or more of time, environmental conditions, or operational conditions.

26. The method of claim 1, wherein eligibility of the designated low-speed navigable path for the DLAAM is determined based on map data associated with the designated low-speed navigable path.

27. A vehicle comprising:

one or more sensors;

an automated driving system communicatively connected with the one or more sensors; and an infotainment system communicatively connected with the automated driving system, wherein the infotainment system accepts an order associated with a designated low-speed navigable path based on a location of the vehicle, and wherein the automated driving system activates based on the location of the vehicle proximate to the designated low-speed navigable path, wherein the designated low-speed navigable path is determined to be eligible for automated driving based on historical use of a designated low-speed area automated mode along the designated low-speed navigable path.

28. The vehicle of claim 27, wherein the infotainment system receives status information of the order, comprising an expected completion time of the order, and wherein the infotainment system sends status information of the vehicle comprising a location of the vehicle.

29. The vehicle of claim 27, wherein the automated driving system detects a payment station or an ordering station associated with the designated low-speed navigable path, and communicates wirelessly with at least one of the payment station or the ordering station to receive readiness indications.

30. A device comprising:

at least one processor; and memory storing instructions, which when executed by the at least one processor, cause the device to perform operations comprising:

receiving an indication of a location of a vehicle;

based on the location of the vehicle, determining the vehicle is in a designated low-speed navigable path for the vehicle, wherein the designated low-speed navigable path is determined to be eligible for a designated low-speed area automated mode (DLAAM) based on historical use of the DLAAM along the designated low-speed navigable path;

based on the determining that the vehicle is in the designated low-speed navigable path, transmitting a request to start the DLAAM, wherein the DLAAM comprises automated driving of the designated low-speed navigable path for the vehicle;

receiving a response indicating authorization to use the DLAAM for the designated low-speed navigable path; and executing the DLAAM for the designated low-speed navigable path.

* * * * *